(12) United States Patent
Mishchik et al.

(10) Patent No.: US 12,481,166 B2
(45) Date of Patent: Nov. 25, 2025

(54) OPTICAL SYSTEM

(71) Applicant: Samsung Display Co., LTD., Yongin-si (KR)

(72) Inventors: Konstantin Mishchik, Yongin-si (KR); Alexander Voronov, Suwon-si (KR); Hyungsik Kim, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 491 days.

(21) Appl. No.: 17/979,724

(22) Filed: Nov. 2, 2022

(65) Prior Publication Data

US 2023/0135389 A1 May 4, 2023

(30) Foreign Application Priority Data

Nov. 3, 2021 (KR) .................. 10-2021-0149638

(51) Int. Cl.
*G02B 27/09* (2006.01)
*G02B 5/00* (2006.01)
(Continued)

(52) U.S. Cl.
CPC ......... *G02B 27/0955* (2013.01); *G02B 5/001* (2013.01); *G02B 27/0927* (2013.01); *G02B 27/1086* (2013.01); *G02B 27/283* (2013.01)

(58) Field of Classification Search
CPC ............................ G02B 27/0955; G02B 5/001; G02B 27/0927; G02B 27/1086; G02B 27/283
See application file for complete search history.

(56) References Cited

U.S. PATENT DOCUMENTS 6,016,223 A    1/2000   Suzuki et al.
9,850,159 B2  12/2017  Bhuyan et al.
(Continued)

FOREIGN PATENT DOCUMENTS

CN    102109680    6/2011
CN    106825915    6/2017
(Continued)

OTHER PUBLICATIONS

DE 102012004312 A1 machine translation (Year: 2012).*
(Continued)

*Primary Examiner* — James A Dudek
(74) *Attorney, Agent, or Firm* — CANTOR COLBURN LLP

(57) ABSTRACT

An optical system includes a phase retardation plate which controls a polarization of an input laser beam, an axicon lens spaced apart from the phase retardation plate on an emitting surface side thereof to convert the input laser beam into a single first Bessel beam having a single cone angle, a collimating lens spaced apart from the axicon lens on an emitting surface side thereof to collimate the single first Bessel beam in a form of a single second Bessel beam having an annular energy distribution, a polarizing beam splitter spaced apart from the collimating lens on an emitting surface side thereof to split the single second Bessel beam into third Bessel beams having different polarization directions, and a focusing lens spaced apart from the polarizing beam splitter on an emitting surface side thereof to focus the plurality of third Bessel beams to form an output laser beam.

20 Claims, 18 Drawing Sheets

(51) Int. Cl.
  *G02B 27/10* (2006.01)
  *G02B 27/28* (2006.01)

(56) References Cited

U.S. PATENT DOCUMENTS

| | | |
|---|---|---|
| 9,850,160 B2 | 12/2017 | Marjanovic et al. |
| 10,047,001 B2 | 8/2018 | West |
| 10,131,017 B2 | 11/2018 | Courvoisier et al. |
| 2016/0159679 A1* | 6/2016 | West ................... B23K 26/064 65/355 |
| 2018/0345419 A1 | 12/2018 | Mikutis |
| 2019/0283178 A1 | 9/2019 | Mishchik et al. |
| 2021/0231991 A1 | 7/2021 | Tam et al. |
| 2022/0032398 A1* | 2/2022 | Kumkar ............. G02B 27/0927 |

FOREIGN PATENT DOCUMENTS

| | | |
|---|---|---|
| CN | 112570911 | 3/2021 |
| DE | 102019205394 | 10/2020 |
| DE | 102019128362 | 2/2021 |
| WO | 2015095088 | 6/2015 |
| WO | 2016089699 | 6/2016 |
| WO | 2016089799 | 6/2016 |
| WO | 2017055576 | 4/2017 |
| WO | 2018020145 | 2/2018 |
| WO | 2020212175 | 10/2020 |
| WO | 2021078772 | 4/2021 |

OTHER PUBLICATIONS

Di Leonardo et al., "Computer generation of optimal holograms for optical trap arrays", Opt. Express, (2007), vol. 15, pp. 1913-1922.

* cited by examiner

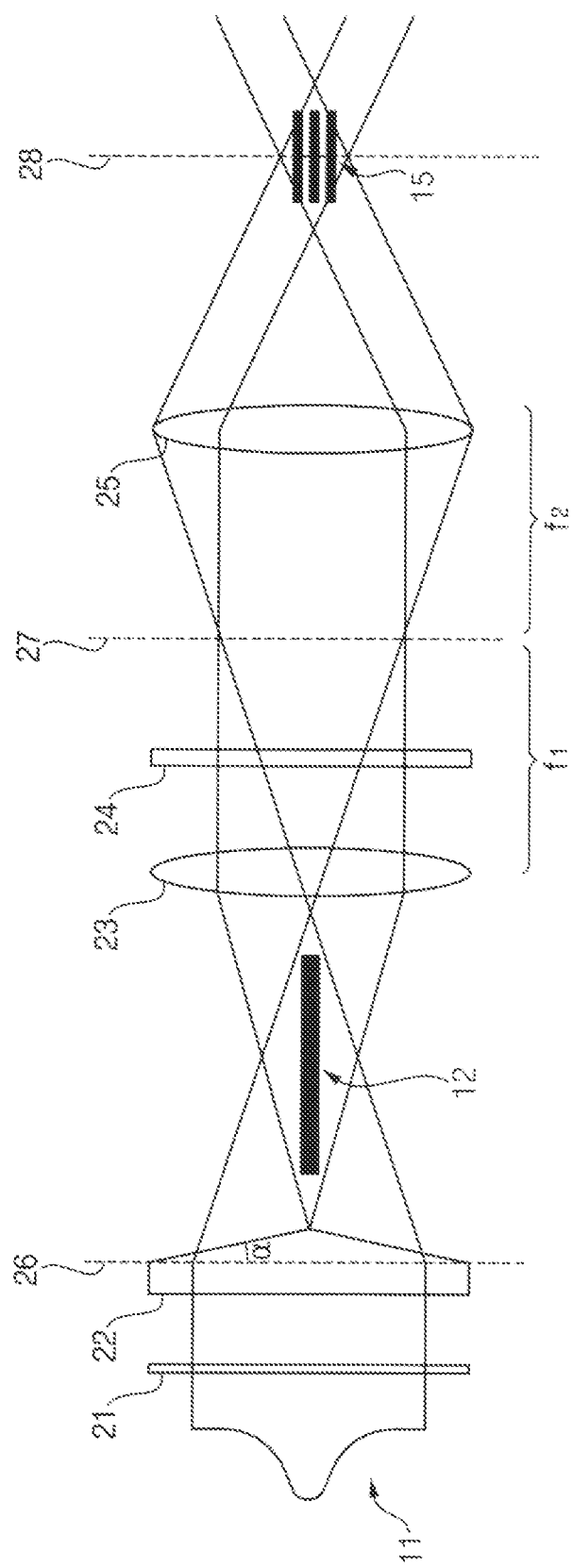

113:113(a),113(b)

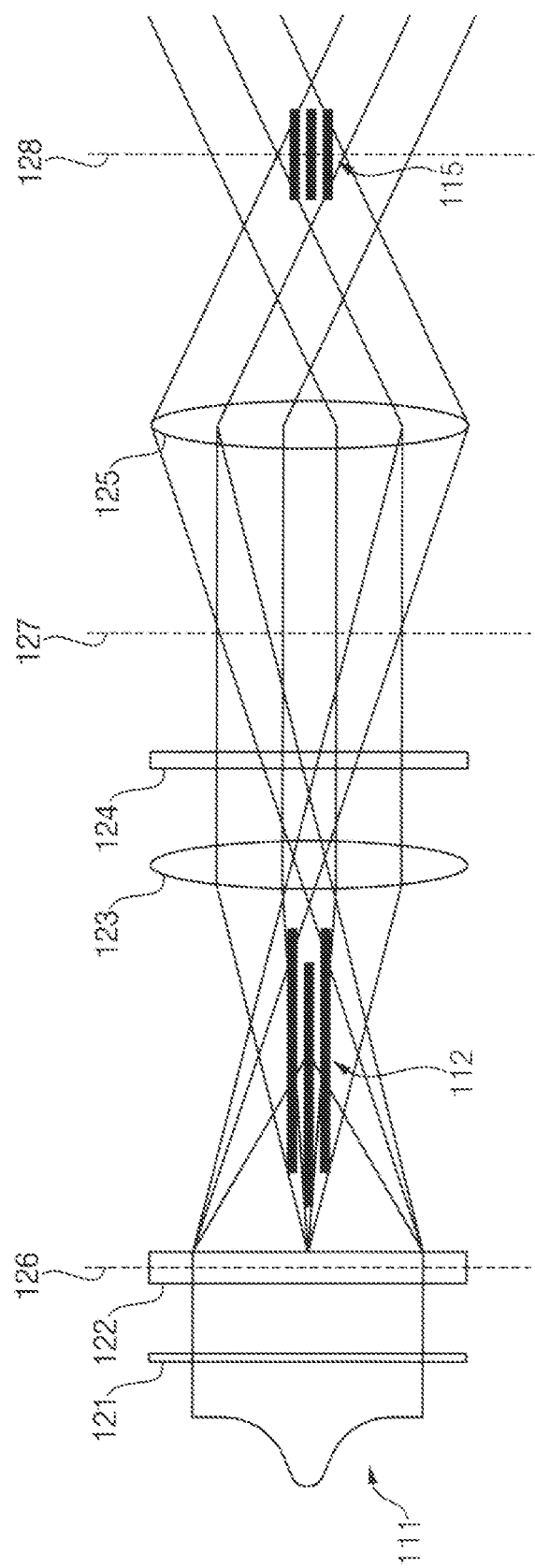

113:113(a),113(b)

113:113(a),113(b)

OPTICAL SYSTEM

This application claims priority to Korean Patent Application No. 10-2021-0149638, filed on Nov. 3, 2021, and all the benefits accruing therefrom under 35 U.S.C. § 119, the content of which in its entirety is herein incorporated by reference.

BACKGROUND

1. Field

Embodiments of the invention relate generally to an optical system. More particularly, embodiments of the invention relates to an optical system for generating non-coherent Bessel beam combination.

2. Description of the Related Art

A laser processing apparatus may focus a continuous wave or pulse wave laser through an optical system to cut a material or form a hole. Recently, the laser processing apparatus mainly uses the pulse wave laser that may cause a filamentation phenomenon in a transparent material such as glass.

SUMMARY

Embodiments provide an optical system capable of generating a homogeneous output laser beam.

An embodiment of an optical system includes a phase retardation plate which controls a polarization of an input laser beam, an axicon lens disposed to be spaced apart from the phase retardation plate on an emitting surface side of the phase retardation plate, wherein the axicon lens converts the input laser beam into a single first Bessel beam having a single cone angle, a collimating lens disposed to be spaced apart from the axicon lens on an emitting surface side of the axicon lens, wherein the collimating lens collimates the single first Bessel beam in a form of a single second Bessel beam having an annular energy distribution, a polarizing beam splitter disposed to be spaced apart from the collimating lens on an emitting surface side of the collimating lens, wherein the polarizing beam splitter splits the single second Bessel beam into a plurality of third Bessel beams having different polarization directions from each other, and a focusing lens disposed to be spaced apart from the polarizing beam splitter on an emitting surface side of the polarizing beam splitter, wherein the focusing lens focuses the plurality of third Bessel beams to form an output laser beam.

In an embodiment, the collimating lens and the focusing lens may be arranged in a 4f optical setting.

In an embodiment, a Fourier plane may be formed between the collimating lens and the focusing lens, and the polarizing beam splitter may be disposed on the Fourier plane.

In an embodiment, the input laser beam may be Gaussian beam.

In an embodiment, the phase retardation plate may control the input laser beam to be in one polarization selected from a linear polarization, a circular polarization, and an elliptical polarization.

In an embodiment, a plurality of sub-Bessel beams included in the output laser beam may be parallel to each other, and the plurality of sub-Bessel beams may be spaced apart from each other by a distance in a range of about 1 micrometer (μm) to about 100 μm.

In an embodiment, the polarizing beam splitter may be a diffraction grating including a birefringence region.

In an embodiment, the diffraction grating may split the single second Bessel beam which is linearly polarized into the plurality of third Bessel beams having different polarization directions from each other.

In an embodiment, the polarizing beam splitter may be a Pancharatnam-Berry optical element.

In an embodiment, the Pancharatnam-Berry optical element may split the single second Bessel beam which is elliptically polarized into the plurality of third Bessel beams which are circularly polarized and having different rotational directions from each other.

In an embodiment, the polarizing beam splitter may be designed to have a phase distribution calculated based on a Gerchberg-Saxton algorithm.

An embodiment of an optical system includes a phase retardation plate which controls a polarization of an input laser beam, a beam conversion element disposed to be spaced apart from the phase retardation plate on an emitting surface side of the phase retardation plate, wherein the beam conversion element divides the input laser beam into a plurality of first Bessel beams having different cone angles from each other by conversing at least one selected from an amplitude and a phase of the input laser beam, a collimating lens disposed to be spaced apart from the beam conversion element on an emitting surface side of the beam conversion element, wherein the collimating lens collimates the plurality of first Bessel beams in a form of a plurality of second Bessel beams having an annular energy distribution, a wave plate having a circular or annular shape and disposed to be spaced apart from the collimating lens on an emitting surface side of the collimating lens, wherein the wave plate forms a plurality of third Bessel beams having different polarization directions from each other by controlling the polarization of the plurality of second Bessel beams and a focusing lens disposed to be spaced apart from the wave plate on an emitting surface side of the wave plate, wherein the focusing lens focuses the plurality of third Bessel beams to form an output laser beam.

In an embodiment, the collimating lens and the focusing lens may be arranged in a 4f optical setting.

In an embodiment, a Fourier plane may be formed between the collimating lens and the focusing lens, and the wave plate may be disposed on the Fourier plane.

In an embodiment, the input laser beam may be Gaussian beam.

In an embodiment, the phase retardation plate may control the input laser beam to be in one polarization selected from a linear polarization, a circular polarization, and an elliptical polarization.

In an embodiment, a plurality of sub-Bessel beams included in the output laser beam may be parallel to each other, and the plurality of sub-Bessel beams may be spaced apart from each other by a distance in a range of about 1 μm to about 100 μm.

In an embodiment, the wave plate may be a half-wave plate and include an active region and an inactive region.

In an embodiment, the wave plate may change the polarization direction of a Bessel beam passing through the active region by 90°.

In an embodiment, the beam conversion element may be at least one selected from an amplitude conversion mask, a phase conversion mask, an amplitude conversion hologram, and a phase conversion hologram.

In embodiments of the invention, the output laser beam generated by an optical system may be a composite Bessel beam that is a combination of a plurality of sub-Bessel beams, and does not cause destructive interference between the sub-Bessel beams, and an intensity and arrangement of the sub-Bessel beams may be flexibly adjusted.

BRIEF DESCRIPTION OF THE DRAWINGS

Illustrative, non-limiting embodiments will be more clearly understood from the following detailed description taken in conjunction with the accompanying drawings.

FIG. 5A is a view illustrating a configuration of the optical system in which the polarizing beam splitter of the optical system of FIG. 1 is disposed in front of the Fourier plane.

FIG. 11A is a view illustrating a configuration of the optical system in which the wave plate of the optical system of FIG. 8 is disposed in front of the Fourier plane.

DETAILED DESCRIPTION

Figure 1:
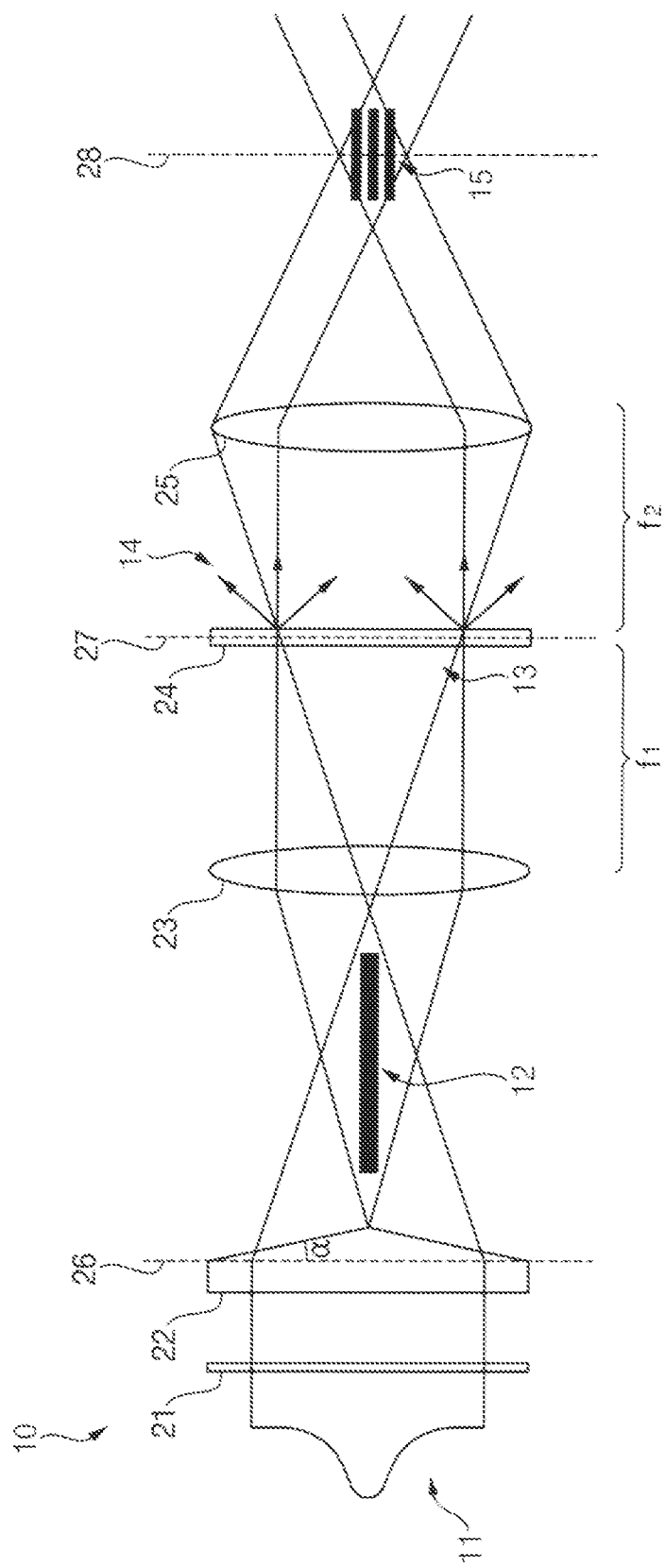
FIG. 1 is a view illustrating an optical system according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a view illustrating an optical system according to an embodiment.

Referring to FIG. 1, an embodiment of an optical system 10 may include a phase retardation plate 21, an axicon lens 22, a collimating lens 23, a polarizing beam splitter 24 and a focusing lens 25. In such an embodiment, the phase retardation plate 21, the axicon lens 22, the collimating lens 23, the polarizing beam splitter 24 and the focusing lens 25 may sequentially disposed along an optical path.

An input laser beam 11 may pass through the phase retardation plate 21. Thereafter, the input laser beam 11 may pass through the axicon lens 22 on an input plane 26 to be converted into a single first Bessel beam 12 having a single cone angle. Thereafter, the single first Bessel beam 12 may pass through the collimating lens 23 to be collimated into a single second Bessel beam 13 having an annular energy distribution. Thereafter, the single second Bessel beam 13 may pass through the polarizing beam splitter 24 to be split into a plurality of third Bessel beams 14 having different polarization directions from each other. Thereafter, the plurality of third Bessel beams 14 may pass through the focusing lens 25 to be focused on an image plane 28 to be formed as an output laser beam 15.

The phase retardation plate 21 may control a polarization of the input laser beam 11. The input laser beam 11 may include any beam having a substantially uniform optical phase. In an embodiment, the input laser beam 11 may be a Gaussian beam.

In an embodiment, the phase retardation plate 21 may control the polarization of the input laser beam 11 to be any one polarization selected from linear polarization, circular polarization, and elliptical polarization. In an embodiment, for example, the phase retardation plate 21 may be a quarter-wave plate that imparts a phase delay of ¼ wavelength to the input laser beam 11 or a half-wave plate that imparts a phase delay of ½ wavelength to the input laser beam 11.

In an embodiment, for example, when the input laser beam 11 which is linearly polarized passes through the quarter-wave plate, the polarization state of the input laser beam 11 is controlled to be circular polarization state. In such an embodiment, when the input laser beam 11 which is circularly polarized passes through the quarter-wave plate, the polarization state of the input laser beam 11 is controlled to be linear polarization state. In an embodiment, when the input laser beam 11 which is linearly polarized passes through the half-wave plate, the polarization direction may change by 90°, and when the input laser beam 11 which is circularly polarized passes through the half-wave plate, the direction of rotation may be reversed. In an embodiment, for example, when the input laser beam 11 which is left-circularly polarized passes through the half-wave plate, right-circularly polarized light may be output. Accordingly, the input laser beam 11 passing through the phase retardation plate 21 may proceed in a state having a specific polarization component.

The axicon lens 22 may be disposed to be spaced apart from the phase retardation plate 21 on an emitting surface side of the phase retardation plate 21. The axicon lens 22 may convert the input laser beam 11 into a single first Bessel beam 12 having a single cone angle.

The axicon lens 22 may be a cone-shaped optical element. The input laser beam 11 may be incident on the axicon lens 22. In this case, the input laser beam 11 may be refracted according to the angle α of the cone shape of the axicon lens 22 and proceed toward the center of the axicon lens 22. That is, the input laser beam 11 incident to the flat portion of the axicon lens 22, that is, the bottom surface of the axicon lens 22, may be refracted toward the vertex of the cone shape of the axicon lens 22. At this time, interference between the beams is generated, and a Bessel profile in which a laser beam of high intensity appears to be long in the traveling direction of the beam may be formed by constructive interference. Accordingly, since the single first Bessel beam 12 is focused on a narrow area, the input laser beam 11 passed through the axicon lens 22 may have a smaller focal size than the input laser beam 11 incident thereon and may have a relatively long focal length.

The collimating lens 23 may be disposed to be spaced apart from the axicon lens 22 on an emitting surface side of the axicon lens 22. The collimating lens 23 may collimate the single first Bessel beam 12 in a form of a single second Bessel beam 13 having an annular energy distribution.

The single first Bessel beam 12 may have the highest energy density in the optical axis and may have a plurality of concentric energy density distributions around the optical axis. The single second Bessel beam 13 formed after passing through the collimating lens 23 may have an energy distribution in the form of ring beam. Accordingly, the single second Bessel beam 13 may have substantially no energy distribution in the vicinity of the optical axis and may have an annular energy distribution only in the periphery. In addition, the single second Bessel beam 13 formed after passing through the collimating lens 23 may proceed substantially parallel on the optical path by the collimating lens 23.

The polarizing beam splitter 24 may be disposed to be spaced apart from the collimating lens 23 on an emitting surface side of the collimating lens 23. The polarizing beam splitter 24 may split the single second Bessel beam 13 into a plurality of third Bessel beams 14 having different polarization directions. The polarizing beam splitter 24 may be an optical element that splits a polarized beam into two or more beams having different polarization states from each other.

In an embodiment, the polarizing beam splitter 24 may be a diffraction grating including a birefringence region.

Figure 2:
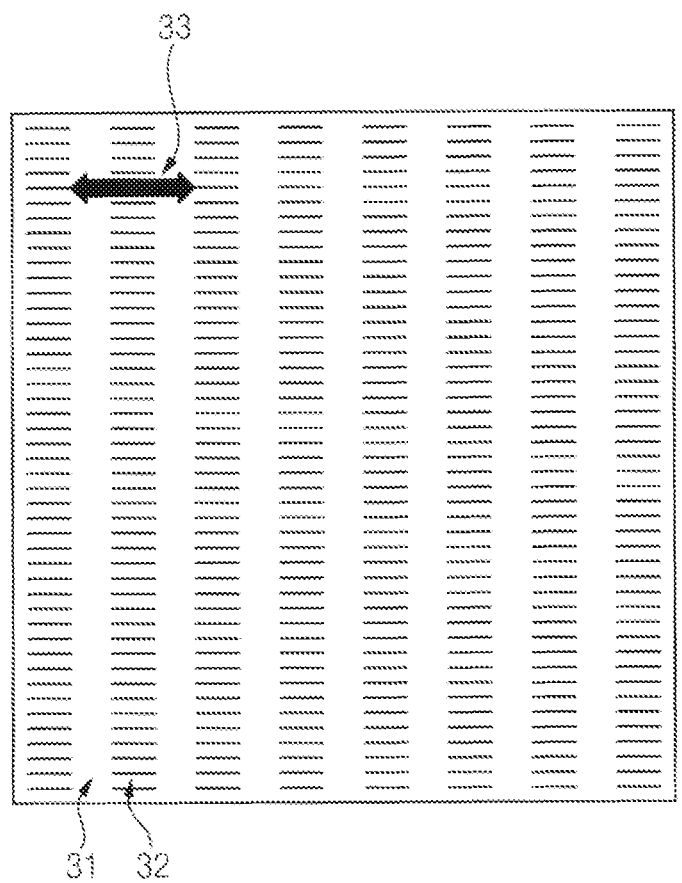
FIG. 2 is a view illustrating a diffraction grating including a birefringence region, which is an embodiment of a polarizing beam splitter of the optical system of FIG. 1.

FIG. 2 is a view illustrating a diffraction grating including a birefringence region, which is an embodiment of the polarizing beam splitter 24.

Referring to FIG. 1 and FIG. 2, in an embodiment where the polarizing beam splitter 24 is a diffraction grating including a birefringence region, the diffraction grating including the birefringence region may include two regions having different characteristics from each other. Among the two regions, the first region may be a non-birefringence region 31 in which the structure of the medium is isotropic, and the second region may be a birefringence region 32 in which the structure of the medium is anisotropic. The role of the two regions is to split the single second Bessel beam 13 which is linearly polarized before passing through the two regions into the plurality of third Bessel beams 14 having different polarization directions from each other.

The birefringence region 32 may have a normal refractive index (no) and an abnormal refractive index (ne), and the non-birefringence region 31 may have a same refractive index as the normal refractive index (no). When the single second Bessel beam which is linearly polarized 13 passes through the birefringence region 32, the single second Bessel beam may be separated into an ordinary ray and an extraordinary ray. In this case, the normal ray may be refracted according to the normal refractive index (no) to have a polarization direction parallel to a crystal optical axis 33 of the birefringence region 32. The abnormal ray may be refracted according to the abnormal refractive index (ne) to have a polarization direction perpendicular to the crystal optical axis 33.

Here, the crystal optical axis 33 means a reference axis used in optics. Optical elements may have rotational symmetry with respect to the crystal optical axis 33.

In such an embodiment, since the non-birefringence region 31 has a same refractive index as the normal refractive index (no), the normal ray may not have a difference in refractive index at the boundary between the non-birefringence region 31 and the birefringence region 32. Thus, the normal ray may proceed as a single beam without disturbance. In such an embodiment, since the abnormal ray has a difference in refractive index at the boundary between the non-birefringence region 31 and the birefringence region 32, a local phase shift due to disturbance may occur. Accordingly, the abnormal ray may be separated into a plurality of beams having different phases from each other to proceed.

Thus, the diffraction grating including the birefringence region 32 may function as the polarizing beam splitter 24 that splits the single second Bessel beam 13 which is linearly polarized into the plurality of third Bessel beams 14 having different polarization directions from each other.

In an embodiment, the polarizing beam splitter 24 may be Pancharatnam-Berry optical element.

Figure 3:
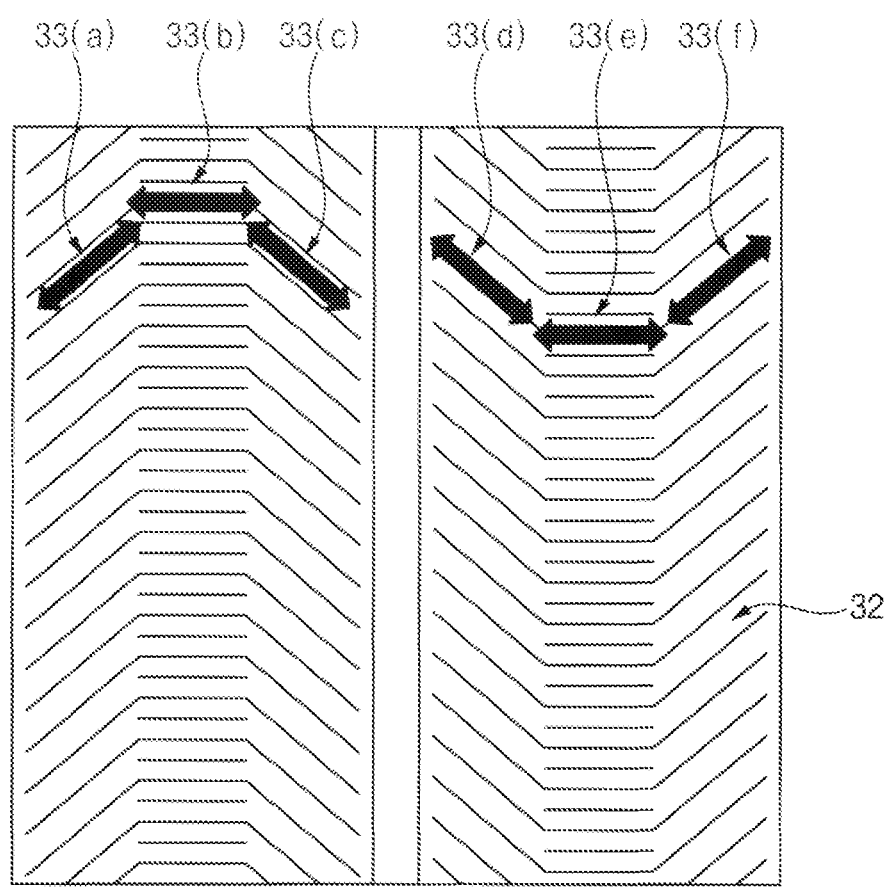
FIG. 3 is a view illustrating a minimum repeating unit constituting a Pancharatnam-Berry optical element, which is an embodiment of a polarizing beam splitter of the optical system of FIG. 1.

FIG. 3 is a view illustrating a minimum repeating unit constituting a Pancharatnam-Berry optical element, which is an embodiment of the polarizing beam splitter 24. The Pancharatnam-Berry optical element may be a geometric phase hologram having a pattern in which the minimum repeating units are repeatedly arranged.

Referring to FIG. 1 and FIG. 3, in an embodiment where the polarizing beam splitter 24 is Pancharatnam-Berry optical element, the minimum repeating unit of the Pancharatnam-Berry optical element may include the birefringence region 32 in which the structure of the medium is anisotropic. The direction in which the birefringence region 32 may be arranged within the minimum repeating unit may be continuously changed. In an embodiment, for example, after the crystal optical axis 33 of the birefringence region 32 rotates clockwise, the arrangement direction of the birefringence region 32 may be continuously changed to rotate counterclockwise. That is, within the minimum repeating unit, the crystal optical axis 33 of the birefringence region 32 may be changed in order of 33(a), 33(b), 33(c), 33(d), 33(e), and 33(f). Based on such an order, the birefringence region 32 may sequentially include a section in which arranged with an upward convex parabolic shape and another section in which arranged with a downward convex parabolic shape.

Depending on an arrangement direction of the crystal optical axis 33 of the birefringence region 32, a right-circularly polarized beam and a left-circularly polarized beam passing through the Pancharatnam-Berry optical element may undergo different geometric phase shifts from each other. Accordingly, the right circularly polarized beam and the left circularly polarized beam may have different propagation paths from each other while passing through the Pancharatnam-Berry optical element.

An elliptically polarized beam may be a combination of the right circularly polarized beam and the left circularly polarized beam which having different amplitudes and phases from each other. Accordingly, when the elliptically polarized beam passes through the Pancharatnam-Berry optical element, the right circularly polarized beam and the left circularly polarized beam constituting the elliptically polarized beam may be split by the different geometric phase shifts, and may be output by following the different propagation paths. Thus, the Pancharatnam-Berry optical element may function as the polarizing beam splitter 24 that splits the single second Bessel beam 13 which is elliptically polarized into the plurality of third Bessel beams 14 which is circularly polarized in different rotational directions from each other.

Referring back to FIG. 1, the focusing lens 25 may be disposed to be spaced apart from the polarizing beam splitter 24 on an emitting surface side of the polarizing beam splitter 24. The focusing lens 25 may focuses the plurality of third Bessel beams 14 to form the output laser beam 15.

The output laser beam 15 formed on the image plane 28 by the focusing lens 25 may be a combination of a plurality of sub-Bessel beams. An energy density of the plurality of sub-Bessel beams may be high, because the diameter of the plurality of sub-Bessel beams may be smaller than the diameters of the first Bessel beam, the second Bessel beam and the third Bessel beam.

In such an embodiment, the plurality of sub-Bessel beams included in the output laser beam 15 may be formed by focusing the plurality of third Bessel beams 14 having different polarization directions from each other on the image plane 28 by passing through the polarizing beam splitter 24, such that destructive interference between the sub-Bessel beams may be minimized.

In an embodiment, the collimating lens 23 and the focusing lens 25 are arranged in a 4f optical setting. In such an embodiment, the 4f optical setting may satisfy the following two conditions. First, the optical system includes a first lens and a second lens, each having a first focal length in the direction of an incident surface and an emitting surface with respect to the first lens, and a second focal length in the direction of an incident surface and an emitting surface with respect to the second. That is, the optical system may have a total of four focal lengths. Second, in the optical system, the first lens and the second lens may be arranged in a way such that a first focal plane in the direction of the emitting surface of the first lens and a second focal plane in the direction of the incident surface of the second lens coincide with each other.

The collimating lens 23 and the focusing lens 25 may function as the first lens and the second lens, respectively. In such an embodiment, the collimating lens 23 and the focusing lens 25 may be disposed in a way such that a first focal plane located at the first focal length f1 in the direction of the emitting surface of the collimating lens 23 and a second focal plane located at the second focal length f2 in the direction of the incident surface of the focusing lens 25 coincide. The Fourier plane 27 may be formed at a position where the first focal plane and the second focal plane coincide with each other.

Figure 4A:
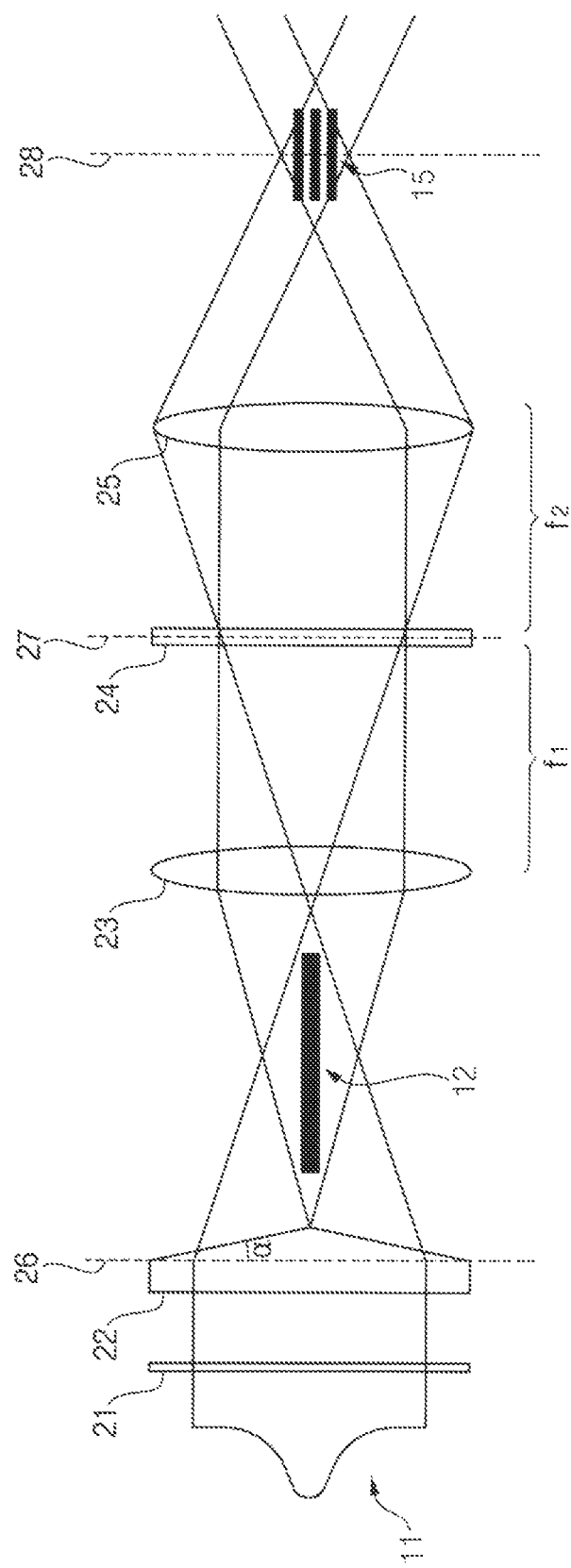
FIG. 4A is a view illustrating a configuration of the optical system in which the polarizing beam splitter of the optical system of FIG. 1 is disposed on a Fourier plane.
Figure 4B:
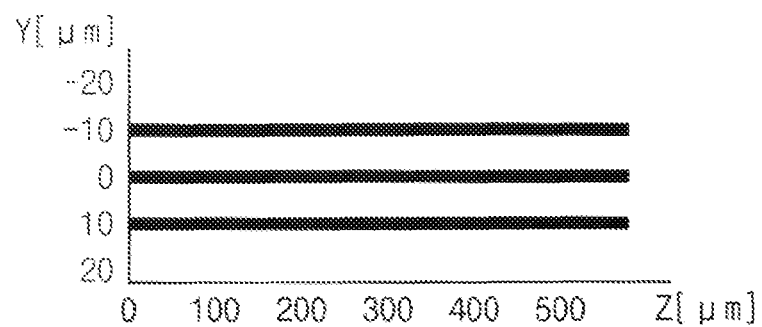
FIG. 4B is a view illustrating an arrangement of an output laser beam according thereto.

In an embodiment, the polarizing beam splitter 24 may be disposed on the Fourier plane 27. Referring to FIG. 4A, in a case where the polarizing beam splitter 24 is disposed on the Fourier plane 27, the plurality of sub-Bessel beams included in the finally obtained output laser beam 15 may proceed parallel to each other and spaced apart at regular intervals as shown in FIG. 4B.

In an embodiment, the plurality of sub-Bessel beams included in the output laser beam 15 may be spaced apart by a distance of about 1 micrometer (μm) to about 100 μm, but is not limited thereto.

Alternatively, the polarizing beam splitter 24 may not be disposed only on the Fourier plane 27. The polarizing beam splitter 24 may be freely disposed on an intermediate region of the collimating lens 23 and the focusing lens 25 if the intensity uniformity between the plurality of sub-Bessel beams included in the output laser beam 15 formed on the image plane 28 is allowed to be maintained.

Figure 5B:
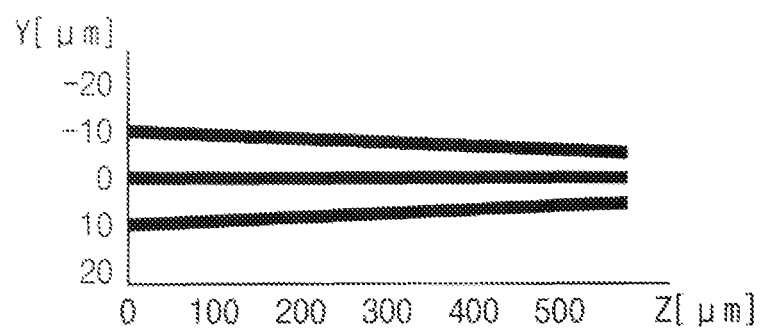
FIG. 5B is a view illustrating an arrangement of an output laser beam according thereto.

In an embodiment, for example, referring to FIG. 5A, the polarizing beam splitter 24 may be disposed in front of the Fourier plane 27, and in such an embodiment, the plurality of sub-Bessel beams included in the finally obtained output laser beam 15 may proceed while being spaced apart from each other at regular intervals and converging to the center on the optical path as shown as shown in FIG. 5B.

Figure 6A:
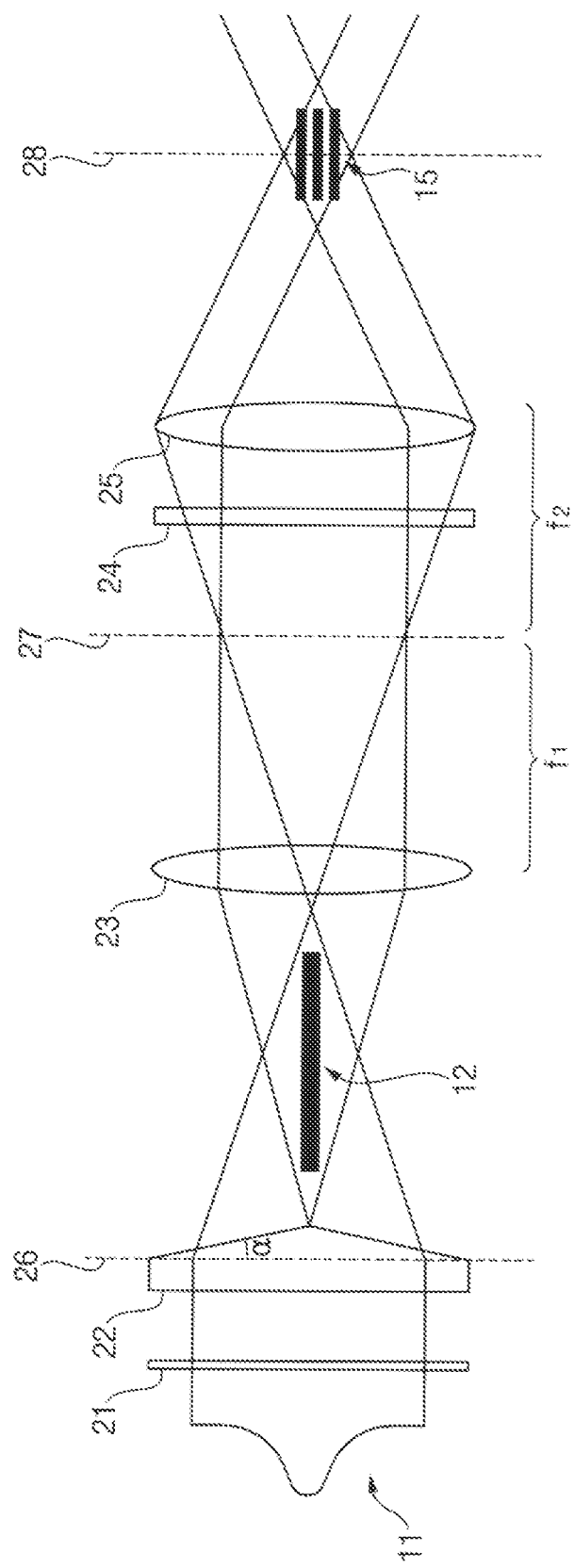
FIG. 6A is a view illustrating a configuration of the optical system in which the polarizing beam splitter of the optical system of FIG. 1 is disposed behind the Fourier plane.
Figure 6B:
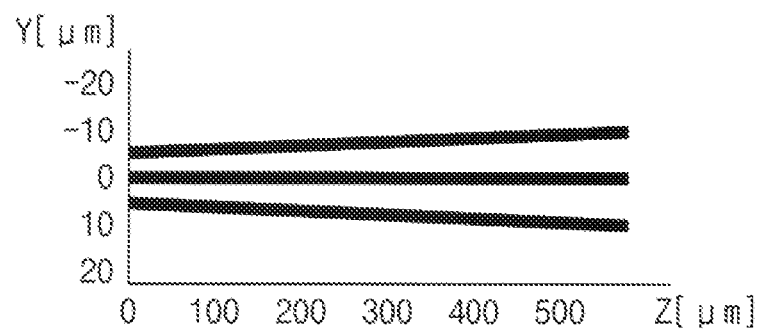
FIG. 6B is a view illustrating an arrangement of an output laser beam according thereto.

In an embodiment, referring to FIG. 6A, the polarizing beam splitter 24 may be disposed behind the Fourier plane 27, and in such an embodiment, the plurality of sub-Bessel beams included in the finally obtained output laser beam 15 may proceed while being spaced apart from each other at regular intervals while radiation outward on the optical path as shown in FIG. 6B.

The polarizing beam splitter 24 may be freely disposed within the intermediate region of the collimating lens 23 and the focusing lens 25. Thus the arrangement of the plurality of sub-Bessel beams included in the output laser beam 15 formed on the image plane 28 may be easily adjusted by adjusting a position where the polarizing beam splitter 24 is disposed.

In an embodiment, where the polarizing beam splitter 24 is disposed on the Fourier plane 27, the plurality of sub-Bessel beams included in the output laser beam 15 may be parallel to and spaced apart from each other. In such an embodiment, the polarizing beam splitter 24 may be disposed on the Fourier plane 27 because the distance therebetween may be maintained more constant and destructive interference may be further minimized.

In an embodiment, the polarizing beam splitter 24 may designed to have a phase distribution calculated by applying a Gerchberg-Saxton algorithm.

Figure 7:
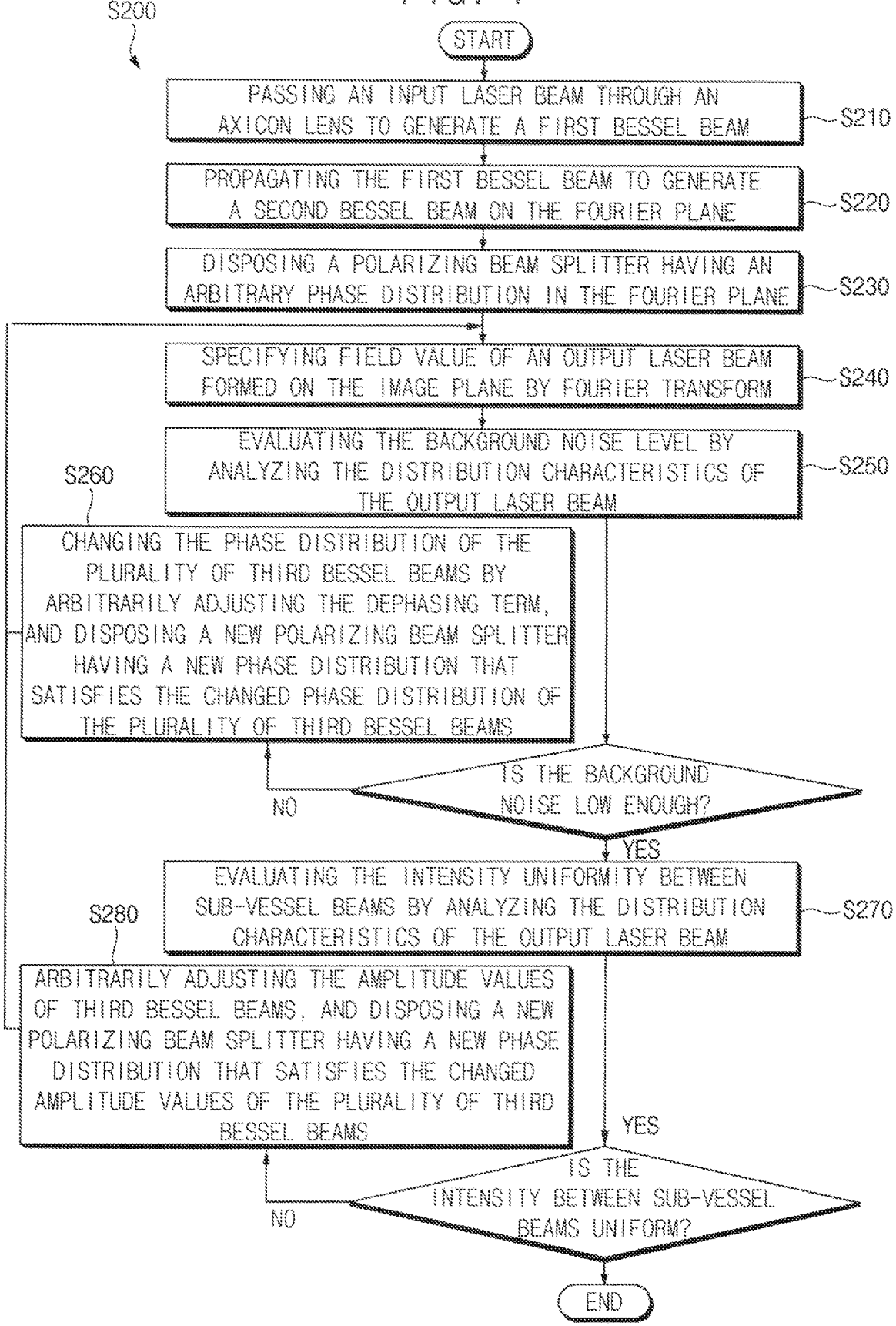
FIG. 7 is a flowchart illustrating a process of designing a polarizing beam splitter of the optical system of FIG. 1.

FIG. 7 is a flowchart illustrating a process of designing a polarizing beam splitter of the optical system of FIG. 1. Here, designing the polarizing beam splitter 24 may mean designing the phase distribution of the polarizing beam splitter 24.

The Gerchberg-Saxton algorithm is a Fourier transform-based algorithm through iterative performance. In an embodiment where the process of designing the polarizing beam splitter 24 of the optical system 10 is applied, the phase distribution of the polarizing beam splitter 24 may be obtained to obtain a predetermined distribution characteristic of the output laser beam 15 on the image plane 28.

Referring to FIG. 7, a process of designing the polarizing beam splitter 24 of the optical system 10 by applying the Gerchberg-Saxton algorithm (S200) will be described as follows.

The first Bessel beam 12 may be generated by passing the input laser beam 11 through the axicon lens 22. (S210) In an embodiment, for example, the input laser beam 11 having a first field value $U_O(x, y)$ may be passed through the axicon lens 22 to generate the first Bessel beam 12 having a second field value $J_O(x, y)$.

Thereafter, the second Bessel beam 13 may be generated on the Fourier plane 27 by propagating the first Bessel beam 12. (S220) In an embodiment, for example, the first Bessel beam 12 having the second field value $J_O(x, y)$ may be propagated to generate the second Bessel beam 13 having a third field value $S(u, v)$ on the Fourier plane 27.

Thereafter, the polarizing beam splitter 24 having an arbitrary phase distribution may be disposed on the Fourier plane 27. (S230) In an embodiment, for example, the polarizing beam splitter 24 having a phase distribution $\varphi_O(u, v)$ may be disposed on the Fourier plane 27 on which the second Bessel beam 13 having the third field value $S(u, v)$.

Thereafter, the field value of the output laser beam 15 formed on the image plane 28 may be specified through Fourier transform. (S240) In an embodiment, for example, a field value $(x'_n, y'_n)$ of the output laser beam 15 may be specified by Fourier transform. In such an embodiment, the output laser beam 15 may be formed on the image plane 28 by focusing the plurality of third Bessel beams 14 emitting from the polarizing beam splitter 24 having the phase distribution $\varphi_O(u, v)$ through the focusing lens 25.

Thereafter, a background noise level may be evaluated by analyzing the distribution characteristic of the output laser beam 15. (S250) In such an embodiment, the background noise may mean a set of scattered beams distributed around a plurality of sub-Bessel beams included in the output laser beam 15.

Based on the background noise evaluation, when the background noise exceeds a desired value, the phase distribution of the plurality of third Bessel beams 14 emitting from the polarizing beam splitter 24 may be calculated through inverse Fourier transform. Thereafter, the phase distribution of the plurality of third Bessel beams 14 may be changed by arbitrarily adjusting the dephasing term, and the polarizing beam splitter 24 having a new phase distribution satisfying a changed phase distribution of the plurality of third Bessel beams 14 may be disposed on the Fourier plane 27. Thereafter, the background noise may be evaluated again (S260).

Processes S250 and S260 may be repeatedly performed until the background noise satisfies a desired value or less.

In an embodiment, a method of arbitrarily adjusting the dephasing term may include a method using a random sampling, a method using a gradient descent, a method using a stochastic gradient method, or other optimization algorithms, but is not limited thereto. In such an embodiment, the dephasing term relates to a mechanism for maintaining system coherence in a quantum system. The dephasing term may be defined as a term that corrects the phase of the plurality of third Bessel beams 14 within a range to reduce the interference effect between the plurality of third Bessel beams 14.

Based on the background noise evaluation, when the background noise satisfies a desired value or is less than the desired value, the distribution characteristic of the output laser beam 15 may be analyzed to evaluate the intensity uniformity between the plurality of sub-Bessel beams included in the output laser beam 15 (S270).

Based on the intensity uniformity evaluation, when the intensity between the plurality of sub-Bessel beams is not uniform, the amplitudes of the plurality of third Bessel beams 14 emitting from the polarizing beam splitter 24 may be calculated through inverse Fourier transform. Thereafter, amplitude of the plurality of third Bessel beams 14 may be arbitrarily adjusted. Thereafter, the polarizing beam splitter 24 having a new phase distribution satisfying the changed amplitude may be disposed on the Fourier plane 27. Thereafter, the intensity uniformity may be evaluated again (S280).

In an embodiment, a method of arbitrarily adjusting the amplitude may include a method of using a weight function, but is not limited thereto.

Processes S270 and S280 may be repeatedly performed until the intensity between the plurality of sub-Bessel beams included in the output laser beam 15 is uniform.

Based on the intensity uniformity evaluation, when the intensity between the plurality of sub-Bessel beams included in the output laser beam 15 is uniform, the polarizing beam splitter 24 having a phase distribution φ(u, v) satisfying the phase distribution and amplitude of the plurality of third Bessel beams 14 which is finally designed may be disposed on the Fourier plane 27. Then, iterative execution of the steps for designing the polarizing beam splitter 24 may be completed.

A process of designing a new phase distribution of the polarizing beam splitter 24 by adjusting the phase distribution and amplitude of the plurality of third Bessel beams 14 emitting from the polarizing beam splitter 24 through inverse Fourier transform in processes S260 and S280 will be described in greater detail as follows.

Based on the field value of the output laser beam 15 on the image plane 28, an inclination angle of the plurality of third Bessel beams 14 emitting from the polarizing beam splitter 24 may be calculated from Equation 1 below.

$$\beta_x = x'_n/f_2 \quad \beta_y = y'_n/f_2 \qquad [\text{Equation 1}]$$

In Equation 1, (xn', yn') denotes a field value of the output laser beam 15 on the image plane 28, β denotes the inclination angle between the plurality of third Bessel beams 14, and $f_2$ denotes a focal length of the focusing lens 25.

Thereafter, a phase distribution of each of the plurality of third Bessel beams 14 may be calculated from Equation 2 below.

$$\varphi_n(u, v) = \frac{2\pi}{\lambda f_2}(ux'_n + vy'_n) + \frac{\pi dz'_n}{\lambda f_2^2}(u^2 + v^2) \qquad [\text{Equation 2}]$$

In Equation 2, (u, v) denotes a field value of the plurality of third Bessel beams 14 on the Fourier plane 27, (xn', yn', zn') denotes a field value of the output laser beam 15 on the image plane 28, λ denotes a wavelength of the beam, and $f_2$ denotes the focal length of the focusing lens 25.

Thereafter, the phase distribution of the plurality of third Bessel beams 14 may be changed while arbitrarily adjusting the dephasing term, and the changed phase distribution of the plurality of third Bessel beams 14 may be calculated from Equation 3 below.

$$\varphi'_n = \varphi_n(u,v) + \Delta\varphi_n \qquad [\text{Equation 3}]$$

In Equation 3, $\Delta\varphi_n$ denotes the dephasing term.

Finally, selectively, the amplitude of plurality of third Bessel beams 14 is adjusted, and the changed phase distribution and the adjusted amplitude of the plurality of third Bessel beams 14 are substituted into Equation 4 below to calculate the phase distribution of polarizing beam splitter 24.

$$\varphi(u,v) = \arg \Sigma A_n e^{i(\varphi_n(u,v) + \Delta\varphi_n)} \qquad [\text{Equation 4}]$$

In Equation 4, $\Delta\varphi_n$ denotes the dephasing term, and $A_n$ denotes the amplitudes of the plurality of third Bessel beams 14.

Through the above process, the phase distribution of the polarizing beam splitter 24 may be designed more flexibly. In addition, the output laser beam 15 generated by the optical system 10 including the polarizing beam splitter 24 designed through the above process may further minimize the intensity of scattered beams other than the plurality of sub-Bessel beams, the plurality of sub-Bessel beams may be distributed with more uniform intensity.

Figure 8:
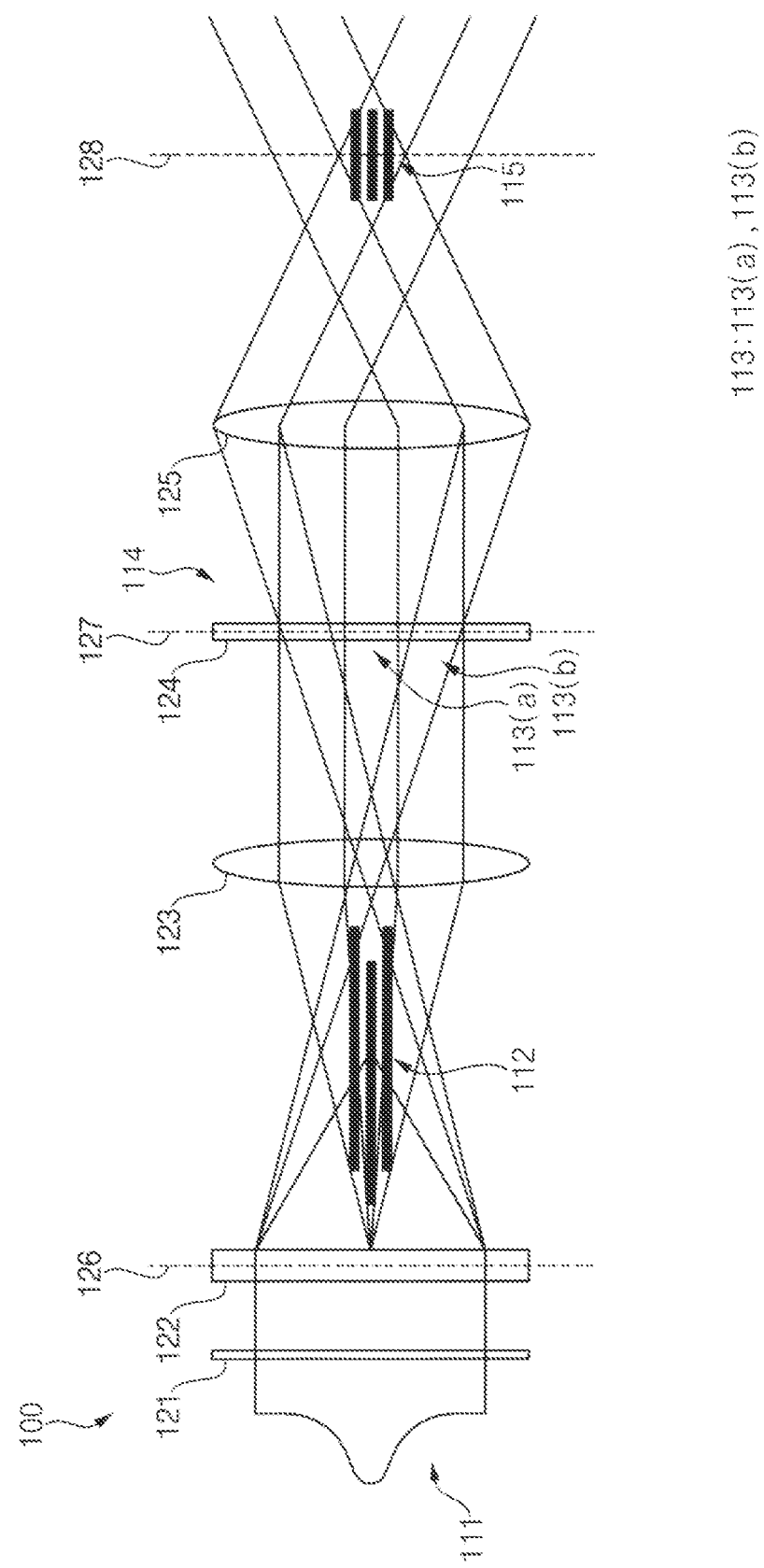
FIG. 8 is a view illustrating an optical system according to an alternative embodiment.

FIG. 8 is a view illustrating an optical system according to an alternative embodiment.

Referring to FIG. 8, an embodiment of an optical system 100 may include a phase retardation plate 121, a beam conversion element 122, a collimating lens 123, a wave plate 124 having a circular or annular shape and a focusing lens 125. The phase retardation plate 121, the beam conversion element 122, the collimating lens 123, the wave plate 124 and the focusing lens 125 may sequentially disposed on an optical path.

An input laser beam 111 may pass through the phase retardation plate 121. Thereafter, the input laser beam 111 may pass through the beam conversion element 122 on an input plane 126 to be divided into a plurality of first Bessel beams 112 generated at different cone angles. Thereafter, the plurality of first Bessel beams 112 may pass through the collimating lens 123 to be collimated into a plurality of second Bessel beams 113 having an annular energy distribution. Thereafter, the plurality of second Bessel beams 113 may pass through the wave plate 124 to be formed into a plurality of third Bessel beams 114 having different polarization directions from each other. Thereafter, the plurality of third Bessel beams 114 may pass through the focusing lens 125 to be focused on an image plane 128 to be formed as an output laser beam 115.

The phase retardation plate 121, the collimating lens 123 and the focusing lens 125 may be substantially the same as or similar to the phase retardation plate 21, the collimating lens 23 and the focusing lens 25 described with reference to FIGS. 1 to 6. Therefore, any repetitive detailed descriptions thereof will be omitted or simplified.

The beam conversion element 122 may be disposed to be spaced apart from the phase retardation plate 121 on the emitting surface side of the phase retardation plate 121. The beam conversion element 122 may divide the input laser beam 111 into the plurality of first Bessel beams 112 having different cone angles from each other by conversing at least one of an amplitude and a phase of the input laser beam 111.

In an embodiment, the beam conversion element 122 may be a spatially patterned mask or hologram. That is, the beam conversion element 122 may be any one selected from an amplitude conversion mask, a phase conversion mask, an amplitude conversion hologram, and a phase conversion hologram, or a combination of two or more thereof, but is not necessarily limited thereto.

Accordingly, the beam conversion element 122 may spatially change the amplitude or phase of the input laser beam 111 as well as split the input laser beam 111 into the plurality of first Bessel beams 112.

In an embodiment, the plurality of first Bessel beams 112 having different cone angles from each other may exhibit different intensity and arrangement profiles determined by a phase and amplitude of each of the first Bessel beams on the input plane 126, and perform very complex modulations. In such an embodiment, a field value reflecting the combination of the plurality of first Bessel beams 112 may be obtained by a consistent combination of the plurality of first Bessel beams 112 having different phases and amplitudes from each other. Therefore, the beam conversion element 122 may convert an initial phase and initial amplitude of the input laser beam 111 together to realize the plurality of first Bessel beams 112 having more uniform intensity and arrangement. Alternatively, the beam conversion element 122 may not convert the initial amplitude and the initial phase of the input laser beam 111 together, and only the initial phase may be changed.

The collimating lens 123 may be disposed to be spaced apart from the beam conversion element 122 on the emitting surface side of the beam conversion element 122. The collimating lens 123 may collimate the plurality of first Bessel beams 112 in a form of the plurality of second Bessel beams 113 having an annular energy distribution. The plurality of second Bessel beams 113 may include an inner Bessel beam 113(a) formed in a relatively inside by ring shape and an outer Bessel beam 113(b) formed in a relatively outside by ring shape.

The wave plate 124 may be disposed to be spaced apart from the collimating lens 123 on the emitting surface side of the collimating lens 123. The wave plate 124 may form the plurality of third Bessel beams 114 having different polarization directions from each other by controlling the polarization of the plurality of second Bessel beams 113.

In an embodiment, the wave plate 124 may be a half-wave plate that imparts a phase delay of ½ wavelength to the plurality of second Bessel beams 113. In such an embodiment, when the plurality of second Bessel beams 113 which is linearly polarized pass through the half-wave plate, a polarization direction may be changed by 90°, and the plurality of second Bessel beams 113 which is circularly polarized pass through the half-wave plate, the plurality of second Bessel beams 113 may be emitted with reversing of a rotation direction. In an embodiment, for example, when the plurality of second Bessel beams 113 which is left-circularly polarized pass through a half-wave plate, the plurality of second Bessel beams 113 may become a right-circularly polarized beam.

In an embodiment, the wave plate 124 may include an active region 131 and an inactive region 132. In such an embodiment, the active region 131 means a region in which a polarization state is changed while the plurality of second Bessel beams 113 pass through the wave plate 124. The inactive region 132 means a region in which the plurality of second Bessel beams 113 proceed without being affected by the wave plate 124.

Figure 9A:
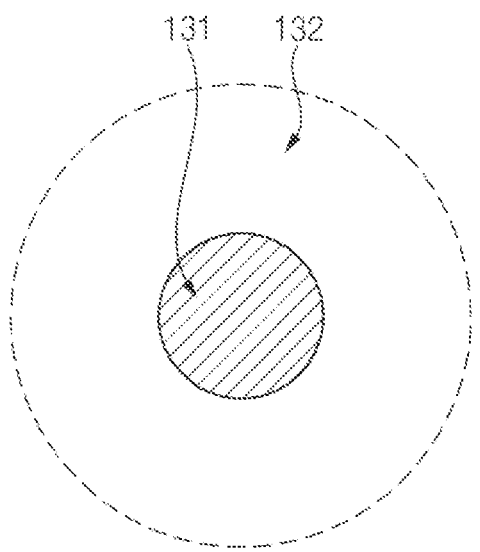
FIG. 9A and FIG. 9B are views illustrating a wave plate having a circular shape or an annular shape disposed in the optical system of FIG. 8.

Referring to FIG. 9A, in an embodiment, the wave plate 124 may have a circular or annular shape. In such an embodiment, the wave plate 124 having the circular shape of FIG. 9A may have the active region 131 only inside the circle. That is, the wave plate 124 having the circular shape may have the inactive region 132 outside the circle. Accordingly, only the inner Bessel beam 113(a) of the plurality of second Bessel beams 113 may pass through the active region 131 of the wave plate 124 having the circular shape and the outer Bessel beam 113(b) may proceed through the inactive region 132. Accordingly, only a polarization state of the inner Bessel beam 113(a) is changed, such that a polarization state of the plurality of second Bessel beams 113 passing through the wave plate 124 having the circular shape may be controlled.

Figure 9B:
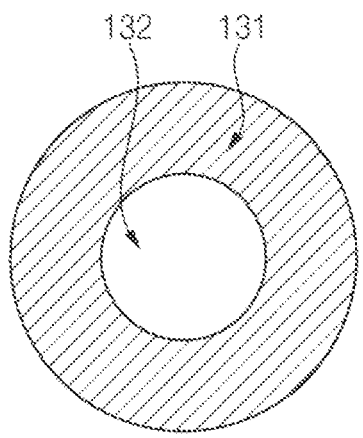

In an alternative embodiment, the wave plate 124 having the annular shape of FIG. 9B, unlike the wave plate 124 having the circular shape, the outer Bessel beam 113(b) may pass through the active region 131, and the inner Bessel beam 113(a) proceeds through the inactive region 132. Accordingly, only a polarization state of the outer Bessel beam 113(a) is changed, such that a polarization state of the plurality of second Bessel beams 113 passing through the wave plate 124 having the annular shape may be controlled.

Accordingly, the plurality of second Bessel beams 113 passing through the wave plate 124 may proceed in the state in which the plurality of third Bessel beams 114 has different polarization directions from each other.

The focusing lens 125 may be disposed to be spaced apart from the wave plate on an emitting surface side of the wave plate 124. The focusing lens 125 may configure to focus the plurality of third Bessel beams 114 to form an output laser beam 115.

In such an embodiment, the plurality of sub-Bessel beams included in the output laser beam 115 may be formed by focusing the plurality of third Bessel beams 114 having different polarization directions from each other on the image plane 128 by passing through the wave plate 124 pass through the circular or annular wave plate 124, such that destructive interference between the sub-Bessel beams may be minimized.

In an embodiment, the collimating lens 123 and the focusing lens 125 may be arranged in a 4f optical setting. In such an embodiment, since the arrangement of the collimating lens 123 and the focusing lens 125 in the 4f optical setting is substantially the same as an arrangement of the collimating lens 23 and the focusing lens 25 described above with reference to FIGS. 1 and 4 to 6, any detailed description thereof will be omitted.

Figure 10A:
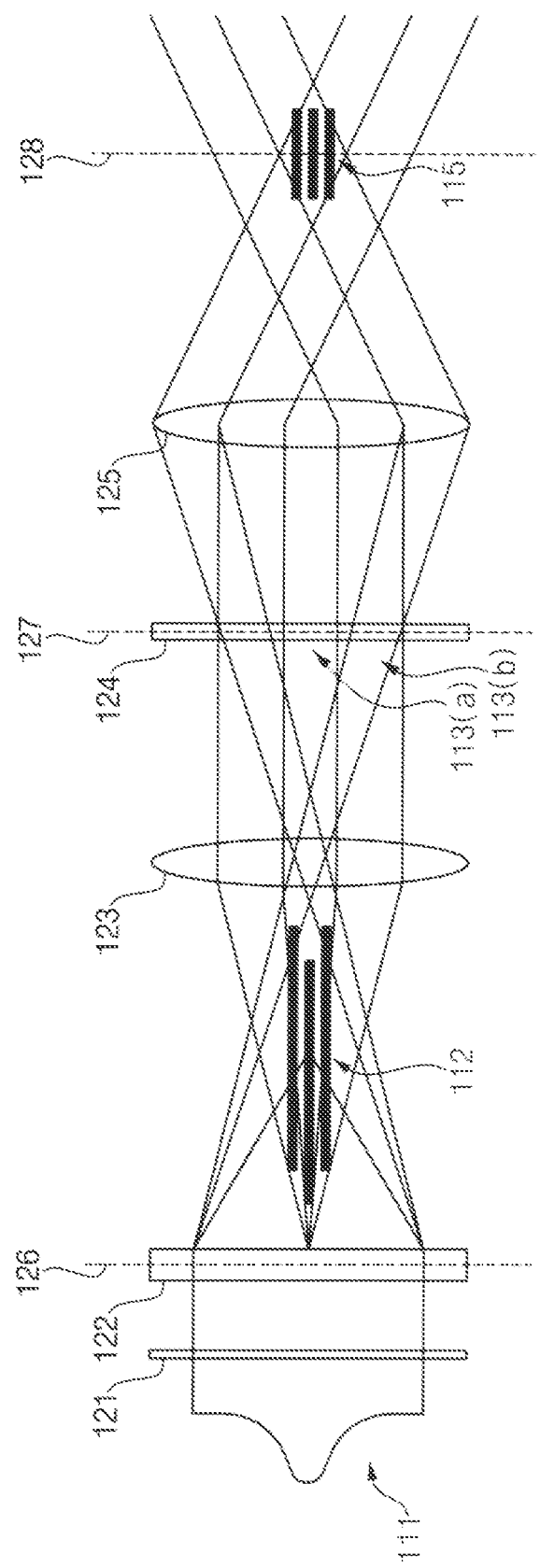
FIG. 10A is a view illustrating a configuration of the optical system in which the wave plate of the optical system of FIG. 8 is disposed on a Fourier plane.
Figure 10B:
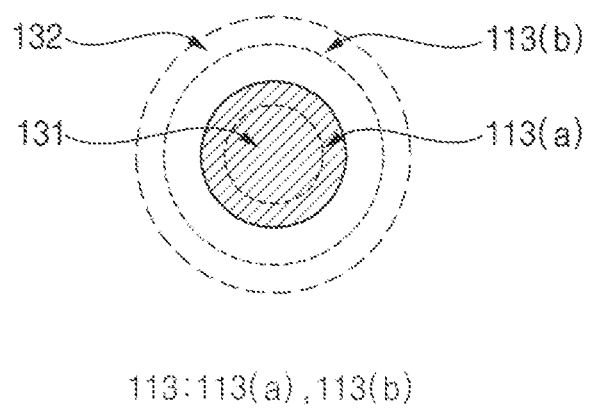
FIG. 10B is a view illustrating an appearance of a plurality of second Bessel beams passing through the wave plate according thereto.

In an embodiment, the wave plate 124 may be disposed on the Fourier plane 127. Referring to FIG. 10A, in an embodiment where the wave plate 124 is disposed on the Fourier plane 127, among the plurality of second Bessel beams 113, the Bessel beam passing through the active region 131 may proceed while passing through the inside of the active region 131 more accurately as shown in FIG. 10B.

In such an embodiment, the wave plate 124 may not be disposed only on the Fourier plane 127. The wave plate 124 may be freely disposed on an intermediate region of the collimating lens 123 and the focusing lens 125 if a Bessel beam passing through the active region 131 among the plurality of second Bessel beams 113 is allowed to be covered completely by the active region 131.

Figure 11B:
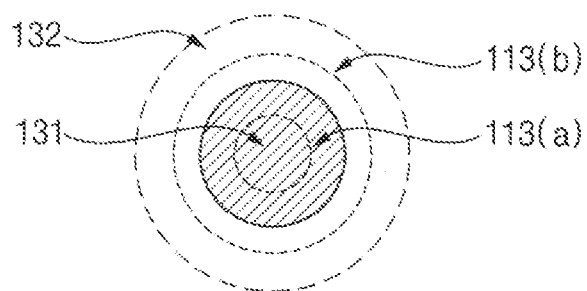
FIG. 11B is a view illustrating an appearance of a plurality of second Bessel beams passing through the wave plate according thereto.

In an embodiment, for example, referring to FIG. 11A, the wave plate 124 may be disposed in front of the Fourier plane 127. In such an embodiment, among the plurality of second Bessel beams 113, a Bessel beam passing through the active region 131 may proceed while passing through the active region 131 more inner than an embodiment in which when the wave plate 124 is disposed on the Fourier plane 127 as shown in FIG. 11B.

Figure 12A:
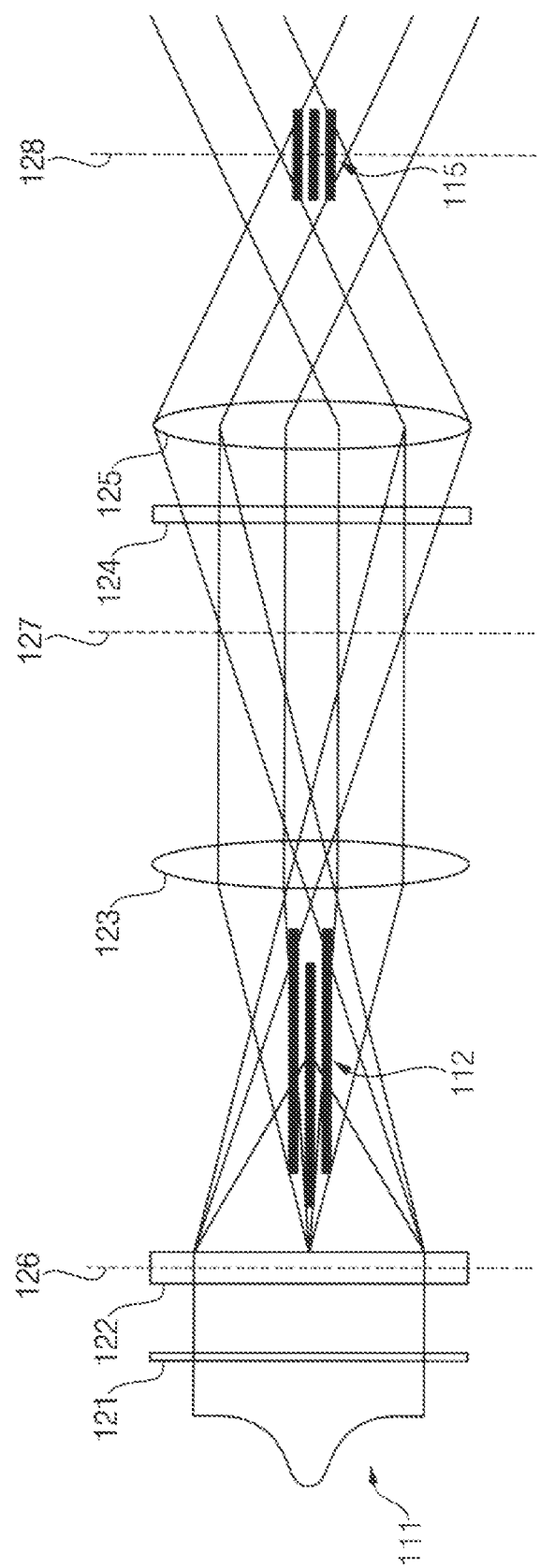
FIG. 12A is a view illustrating a configuration of the optical system in which the wave plate of the optical system of FIG. 8 is disposed behind the Fourier plane.
Figure 12B:
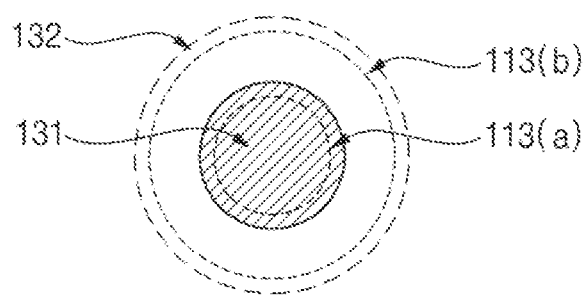
FIG. 12B is is a view illustrating an appearance of a plurality of second Bessel beams passing through the wave plate according thereto.

In an embodiment, referring to FIG. 12A, the wave plate 124 may be disposed behind the Fourier plane 127. In such an embodiment, among the plurality of second Bessel beams 113, a Bessel beam passing through the active region 131 may proceed while passing through the active region 131 more outer than an embodiment in which when the wave plate 124 is disposed on the Fourier plane 127 as shown in FIG. 11B.

In an embodiment, where the wave plate 124 is disposed on the Fourier plane 127, among the plurality of second Bessel beams 113, only a Bessel beam for which a polarization direction is to be controlled may pass through the active region 131 more precisely. Therefore, in such an embodiment, the wave plate 124 may be disposed on the Fourier plane 127 to further minimize the error during polarization control.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An optical system comprising:
a phase retardation plate which controls a polarization of an input laser beam;
an axicon lens disposed to be spaced apart from the phase retardation plate on an emitting surface side of the phase retardation plate, wherein the axicon lens converts the input laser beam into a single first Bessel beam having a single cone angle;
a collimating lens disposed to be spaced apart from the axicon lens on an emitting surface side of the axicon lens, wherein the collimating lens collimates the single first Bessel beam in a form of a single second Bessel beam having an annular energy distribution;
a polarizing beam splitter disposed to be spaced apart from the collimating lens on an emitting surface side of the collimating lens, wherein the polarizing beam splitter splits the single second Bessel beam into a plurality of third Bessel beams, and polarization directions of the plurality of third Bessel beams are different from each other; and
a focusing lens disposed to be spaced apart from the polarizing beam splitter on an emitting surface side of the polarizing beam splitter, wherein the focusing lens focuses the plurality of third Bessel beams to form an output laser beam.

2. The optical system of claim 1, wherein the collimating lens and the focusing lens are arranged in a 4f optical setting.

3. The optical system of claim 2, wherein
a Fourier plane is formed between the collimating lens and the focusing lens, and
the polarizing beam splitter is disposed on the Fourier plane.

4. The optical system of claim 1, wherein the input laser beam is Gaussian beam.

5. The optical system of claim 1, wherein the phase retardation plate controls the input laser beam to be in one polarization selected from a linear polarization, a circular polarization, and an elliptical polarization.

6. The optical system of claim 1, wherein
a plurality of sub-Bessel beams included in the output laser beam are parallel to each other, and
the plurality of sub-Bessel beams are spaced apart from each other by a distance in a range of about 1 μm to about 100 μm.

7. The optical system of claim 1, wherein the polarizing beam splitter is a diffraction grating including a birefringence region.

8. The optical system of claim 7, wherein the diffraction grating splits the single second Bessel beam, which is linearly polarized, into the plurality of third Bessel beams having different polarization directions from each other.

9. The optical system of claim 1, wherein the polarizing beam splitter is a Pancharatnam-Berry optical element.

10. The optical system of claim 9, wherein the Pancharatnam-Berry optical element splits the single second Bessel beam, which is elliptically polarized, into the plurality of third Bessel beams, which are circularly polarized and have different rotational directions from each other.

11. The optical system of claim 9, wherein the polarizing beam splitter has a phase distribution calculated based on a Gerchberg-Saxton algorithm.

12. An optical system comprising:
a phase retardation plate which controls a polarization of an input laser beam;
a beam conversion element disposed to be spaced apart from the phase retardation plate on an emitting surface side of the phase retardation plate, wherein the beam conversion element divides the input laser beam into a plurality of first Bessel beams having different cone angles from each other by conversing at least one selected from an amplitude and a phase of the input laser beam;
a collimating lens disposed to be spaced apart from the beam conversion element on an emitting surface side of the beam conversion element, wherein the collimating lens collimates the plurality of first Bessel beams in a form of a plurality of second Bessel beams having an annular energy distribution;
a wave plate having a circular or annular shape and disposed to be spaced apart from the collimating lens on an emitting surface side of the collimating lens, wherein the wave plate forms a plurality of third Bessel beams, and polarization directions of the plurality of third Bessel beams are different from each other by controlling the polarization of the plurality of second Bessel beams; and
a focusing lens disposed to be spaced apart from the wave plate on an emitting surface side of the wave plate, wherein the focusing lens focuses the plurality of third Bessel beams to form an output laser beam.

13. The optical system of claim 12, wherein the collimating lens and the focusing lens are arranged in a 4f optical setting.

14. The optical system of claim 13, wherein
A Fourier plane is formed between the collimating lens and the focusing lens, and
the wave plate is disposed on the Fourier plane.

15. The optical system of claim 12, wherein the input laser beam is Gaussian beam.

16. The optical system of claim 12, wherein the phase retardation plate controls the input laser beam to be in one polarization selected from a linear polarization, a circular polarization, and an elliptical polarization.

17. The optical system of claim 12, wherein
a plurality of sub-Bessel beams included in the output laser beam are parallel to each other, and
the plurality of sub-Bessel beams are spaced apart from each other by a distance in a range of about 1 μm to about 100 μm.

18. The optical system of claim 12, wherein
the wave plate is a half-wave plate and includes an active region and an inactive region.

19. The optical system of claim 18, wherein the wave plate changes the polarization direction of a Bessel beam passing through the active region by 90°.

20. The optical system of claim 12, wherein the beam conversion element comprises at least one selected from an amplitude conversion mask, a phase conversion mask, an amplitude conversion hologram, and a phase conversion hologram.

* * * * *